(12) United States Patent
Jalali et al.

(10) Patent No.: US 10,676,610 B2
(45) Date of Patent: Jun. 9, 2020

(54) COMPOSITE FUEL PIPES

(71) Applicant: BOMBARDIER INC., Dorval (CA)

(72) Inventors: Mohsen Jalali, Montreal (CA); Fidele Moupfouma, Beaconsfield (CA)

(73) Assignee: BOMBARDIER INC., Dorval, Quebec (CA)

(*) Notice: Subject to any disclaimer, the term of this patent is extended or adjusted under 35 U.S.C. 154(b) by 741 days.

(21) Appl. No.: 14/429,978

(22) PCT Filed: Sep. 19, 2013

(86) PCT No.: PCT/IB2013/002050
§ 371 (c)(1),
(2) Date: Mar. 20, 2015

(87) PCT Pub. No.: WO2014/045098
PCT Pub. Date: Mar. 27, 2014

(65) Prior Publication Data
US 2015/0232657 A1 Aug. 20, 2015

Related U.S. Application Data

(60) Provisional application No. 61/703,849, filed on Sep. 21, 2012.

(51) Int. Cl.
| | |
|---|---|
| *C08L 63/00* | (2006.01) |
| *F16L 9/128* | (2006.01) |
| *C08K 9/08* | (2006.01) |
| *C08K 9/04* | (2006.01) |
| *C08G 59/54* | (2006.01) |
| *C08J 5/24* | (2006.01) |

(Continued)

(52) U.S. Cl.
CPC .............. *C08L 63/00* (2013.01); *C08G 59/54* (2013.01); *C08J 5/24* (2013.01); *C08K 3/346* (2013.01);
(Continued)

(58) Field of Classification Search
CPC ......... F16L 9/18; F16L 39/005; B64D 37/005
(Continued)

(56) References Cited

U.S. PATENT DOCUMENTS 4,323,454 A * 4/1982 Fritzsche ............. B01D 63/023
210/321.61
5,760,106 A 6/1998 Pinnavaia et al.
(Continued)

FOREIGN PATENT DOCUMENTS

CN 201763476 * 3/2011

OTHER PUBLICATIONS

International Search Report and Written Opinion dated Mar. 13, 2014, for International Patent Application No. PCT/IB2013/002050.

*Primary Examiner* — Ellen S Wood
(74) *Attorney, Agent, or Firm* — Karceski IP Law, PLLC

(57) ABSTRACT

A fuel pipe for an aircraft having a wall made of a material including a matrix composed of an epoxy copolymer obtained through the reaction of a resin of the bisphenol A diglycidyl ether type with an amine hardener, and from 3 to 5% of an organically modified nanoclay by weight of the epoxy copolymer, the nanoclay including layered magnesium aluminum silicate platelets, and reinforcing fibers embedded in the matrix. In one example, the resin is a bisphenol A epichlorohydrin based resin, a phenol, 4,40-(1-methylethylidene) bis-polymer with (chloromethyl) oxirane; the nanoclay is provided in a 4% weight proportion to the epoxy copolymer, and is a montmorillonite; the amine hardener is an amidoamine.

18 Claims, 2 Drawing Sheets

(51) Int. Cl.
- *C08K 3/34* (2006.01)
- *C08K 7/02* (2006.01)
- *C08K 7/06* (2006.01)
- *C08K 7/14* (2006.01)
- *B64D 37/00* (2006.01)

(52) U.S. Cl.
CPC ............... *C08K 7/02* (2013.01); *C08K 7/06* (2013.01); *C08K 7/14* (2013.01); *C08K 9/04* (2013.01); *C08K 9/08* (2013.01); *F16L 9/128* (2013.01); *B64D 37/005* (2013.01); *C08J 2363/00* (2013.01); *Y10T 428/139* (2015.01)

(58) Field of Classification Search
USPC .................. 428/34.1, 35.7; 138/112, 148
See application file for complete search history.

(56) References Cited

U.S. PATENT DOCUMENTS

| | | |
|---|---|---|
| 7,163,973 B2 | 1/2007 | Ahsan |
| 8,143,337 B1 | 3/2012 | Lee et al. |
| 2003/0153670 A1 | 8/2003 | Pophusen et al. |
| 2005/0202258 A1 | 9/2005 | Swales et al. |
| 2007/0299202 A1 | 12/2007 | Hoa et al. |
| 2008/0187698 A1 | 8/2008 | Brown et al. |
| 2009/0025815 A1 | 1/2009 | Becks et al. |
| 2009/0294453 A1 | 12/2009 | Brown et al. |
| 2010/0028583 A1 | 2/2010 | Fish, Jr. et al. |
| 2011/0288210 A1 | 11/2011 | Pinnavaia et al. |
| 2012/0296012 A1* | 11/2012 | Palmese ............... C08G 59/184 523/427 |

* cited by examiner

COMPOSITE FUEL PIPES

CROSS-REFERENCE TO RELATED APPLICATIONS

This is a National Stage Entry into the United States Patent and Trademark Office from International PCT Patent Application No. PCT/IB2013/002050, having an international filing date of Sep. 19, 2013, which claims priority from U.S. provisional application No. 61/703,849, filed on Sep. 21, 2012, the entire contents of both of which are incorporated by reference herein.

TECHNICAL FIELD

The application relates generally to fuel pipes and, more particularly, to aircraft fuel pipes.

BACKGROUND OF THE ART

Fuel pipes in aircraft must typically be designed such as to limit the definition of a path of conduction for the electrical charge created in case of lightning strike. In addition, fuel pipes must meet certain flammability requirements.

It has been known to provide metallic fuel pipes in composite wing structures in order to meet the flammability requirements; such pipes are generally wrapped with isolators to avoid current transfer through the pipes, however such isolators may increase the cost and weight of the aircraft.

SUMMARY

In one aspect, there is provided a fuel pipe for an aircraft, the fuel pipe comprising a wall made of a material including: a matrix composed of an epoxy copolymer obtained through the reaction of a resin of the bisphenol A diglycidyl ether type with an amine hardener, and from 3 to 5% of an organically modified nanoclay by weight of the epoxy copolymer, the nanoclay including layered magnesium aluminum silicate platelets; and reinforcing fibers embedded in the matrix.

DESCRIPTION OF THE DRAWINGS

Reference is now made to the accompanying figures in which.

DETAILED DESCRIPTION

Composite fuel pipes, in particular when used in a composite aircraft structure, may present several advantages over metal pipes, for example with respect to weight and cost. Because of the low conductivity nature of the composite pipes as compared with metallic pipes, the possibilities of coupling of magnetic field as well as transfer of direct current are generally reduced. However, composite pipes have a higher level of flammability because of the hydrocarbon nature of the pipes.

It has been found that the addition of an appropriate type of nanoclay to an appropriate epoxy/glass composite advantageously reduces the flammability of the material and provides for a material suitable for use in fuel pipes in compliance with flammability certification requirements.

Figure 1:
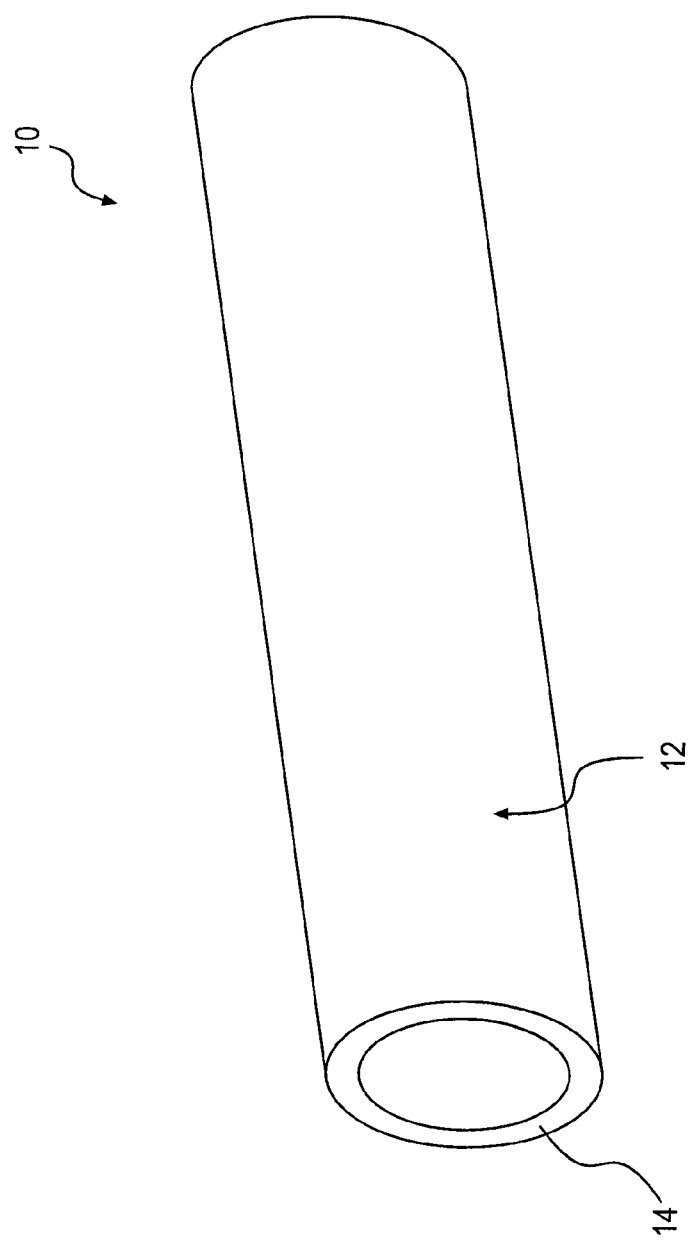
FIG. 1 is a schematic view of a fuel pipe according to a particular embodiment.

Referring to FIG. 1, a pipe 12 forming part of a fuel distribution system 10, which in a particular embodiment is located in an aircraft, is shown. The pipe 12 is defined by a tubular wall 14 which in the embodiment shown is made of a single layer of material; alternately, multiple layers may be used. The wall 14 is made of a material including a polymer matrix and reinforcing fibers.

The matrix includes an epoxy copolymer, which is formed by the reaction of a resin and a hardener. Suitable types of epoxy resins include glycidyl-ether, glycidyl-ester and glycidyl-amine epoxy resins as well as the non-glycidyl epoxy resins like aliphatic or cycloaliphatic epoxy resins. In a particular embodiment, the resin is EPON™ 828, a liquid bisphenol A epichlorohydrin based epoxy resin with the chemical designation of Phenol, 4,4O-(1-methylethylidene) bis-polymer with (chloromethyl) oxirane. EPON™ 828 is a resin of the DGEBPA (bisphenol A diglycidyl ether) type.

In a particular embodiment, the resin includes or is composed of $C_{60}H_{64}O_8 \cdot C_{12}H_{20}Cl_4O_4$.

In a particular embodiment, the resin includes or is composed of $(C_{15}H_{16}O_2 \cdot C_3H_5ClO)_x$, where x is from 2 to 10, and preferably 4.

In a particular embodiment, the resin includes, is composed of or is derived from the following compound:

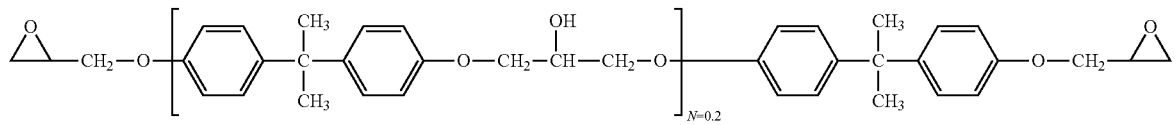

In a particular embodiment, the hardener added to the liquid resin to obtain the epoxy is an amine hardener, more particularly EPIKURE™ 3046, a polyamidoamine containing triethylenetetramine from Resolution Performance Products LLC. Other types of suitable hardeners may alternately be used, including but not limited to EPIKURE™ 3271 (a modified aliphatic amine), EPIKURE™ 3140 (a polyamide, high imidazoline, moderate molecular weight hardener based on dimerized fatty acid and polyamines), EPIKURE™ 3300 (a cycloaliphatic amine), EPIKURE™ 3125 (a polyamide hardener based on dimerized fatty acid and polyamines) and EPIKURE™ 3370 (a cycloaliphatic amine).

In a particular embodiment, the quantity of hardener is from 35% to 100% that of the resin by weight; in another particular embodiment, the weight ratio of resin to hardener is 2:1.

The matrix of the material of the wall 14 also includes an appropriate type of nanoclay mixed with the resin before reaction with the hardener. For the nanoclay, a platelet structure such as montmorillonite was selected over a nanotube structure such as halloysite. Because of the structure of the montmorillonite, polymer chains of epoxy can be intercalated into the interlayer of layered silicate of montmorillonite to form epoxy/montmorillonite nanocomposites with flame-retardant properties.

In a particular embodiment, the nanoclay is Cloisite® 30B from Southern Clay Products, a natural montmorillonite modified with a quaternary ammonium salt, treated with MT2EtOH (methyl, tallow, bis-(2-hydroxyethyl) quaternary ammonium). Typical properties include a concentration of MT2EtOH of 90 meq/100 g clay, less than 2% moisture, 30% weight loss on ignition and a d-spacing ($d_{001}$) of 1.85 nm. Cloisite® 30B may be defined as

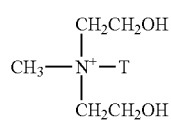

where T is Tallow (~65% C18; ~30% C16; ~5% C14); anion: chloride

In another particular embodiment, the nanoclay is Nanomer® 1.30E from Nanocor Inc., a surface modified montmorillonite treated with ODA (octadecyl amine), a primary amine base. Typical properties include a cation exchange capacity of 1.45, less than 3% moisture, and d-spacing ($d_{001}$) of 2.38 nm.

In a particular embodiment, the reinforcing fibers are TG-06-P fibers, E-glass fibers from JB Martin Texitek Division E-glass fibers. Other types of glass fibers may alternately be used, including other E-glass (alumino-borosilicate glass with less than 1% w/w alkali oxides), A-glass (alkali-lime glass with little or no boron oxide), E-CR-glass (alumino-lime silicate with less than 1% w/w alkali oxides), C-glass (alkali-lime glass with high boron oxide content), D-glass (borosilicate glass with high dielectric constant), R-glass (alumino silicate glass without MgO and CaO), S-glass (alumino silicate glass without CaO but with high MgO content); other types of fibers such as aramid (e.g. Kevlar®) fibers, flax fibers and carbon fibers may also be used.

In a particular embodiment, the fibers are woven; other fiber structures may alternately be used.

Flammability tests were performed on different materials with and without the nanoclay additives, as set forth below. The epoxy/glass samples with nanoclay were manufactured by first dispersing the montmorillonite nanoparticles in the resin by using a mechanical mixer (high speed around 10 000 rpm for 10 minutes, temperature control below 120° C.). The composites with 1 layer of woven glass fibers were prepared using the mixed resin and nanoclay as the matrix. The hardener was added into the mixture of resin and nanoclay and the resulting resin, nanoclay and hardener mixture was impregnated to the glass fibers using hand lay-up method. The composites were cured at room temperature for 2 days with subsequent post curing for 2 hours at 100° C.

For all tested materials, samples were cut out from the injected or molded plaques to dimensions of 5 in (127 mm)×0.5 in (12.7 mm) and marked along their length at 1 in (25.4 mm), 2.5 in (63.5 mm) and 4 in (101.6 mm). Each sample was fixed horizontally and inclined at 45° along its width axis. A blue flame approximately 1 in (25.4 mm) long was applied for 30 seconds so that about ¼ of the extremity of the sample was within the flame, after which the flame was removed. If the sample burned up to the first mark (at 1 in) before 30 seconds, the flame was immediately removed. All tests were recorded using a video camera and the films were analyzed to determine the time necessary for the combustion to reach 1 in (25.4 mm), 2.5 in (63.5 mm), 4 in (101.6 mm) and 5 in (127 mm), where applicable.

All samples had a thickness below 0.120 in (3.05 mm). The material was considered compliant if for the samples tested the speed of combustion did not exceed 3.0 in/min (76.2 mm/min) or if the combustion stopped before the flame reached the 4 in (101.6 mm) mark.

All samples where conditioned at 23° C. for 48 hours, at a humidity level of 50% before the tests.

Test 1

Epoxy/Glass

Samples were cut from an epoxy/glass composite without nanoclay. The resin was EPON™ 828 and the hardener was Epikure™ 3046 described above. The weight proportion of resin to hardener was 2:1, and the material included one layer of plain weave E-glass fibers TG-06-P. The thickness of the samples was approximately 1.5 mm. The results are set forth in the table below.

Seconds to reach burn length, epoxy/glass, no nanoclay

| No. | 1 in | 2.5 in | 4 in | 5 in |
| --- | --- | --- | --- | --- |
| 1 | 27 | 74 | 117 | 150 |
| 2 | 27 | 74 | 118 | 150 |
| 3 | 31 | 83 | 124 | 157 |
| 4 | 23 | 71 | 120 | 149 |
| 5 | 25 | 70 | 118 | 150 |
| Mean | 26.6 | 74.4 | 119.4 | 151.2 |
| Inch/min | 2.26 | 2.01 | 2.01 | 1.98 |

The samples are compliant since the burn rate is below 3 in/min.

Test 2

Epoxy/Glass With 2% Cloisite® 30B

Samples were cut from an epoxy/glass composite with a 2% weight addition of nanoclay, the 2% weight ratio being defined with respect to the weight of epoxy (resin and hardener). The resin, hardener and glass fibers were the same as that in Test 1. The nanoclay was Cloisite® 30B, described above. The thickness of the samples was approximately 1.5 mm. The results are set forth in the table below.

Seconds to reach burn length, epoxy/glass, 2% Cloisite® 30B

| No. | 1 in | 2.5 in | 4 in | 5 in |
| --- | --- | --- | --- | --- |
| 1 | 27 | 74 | 118 | 149 |
| 2 | 26 | 74 | 116 | 152 |
| 3 | 28 | 74 | 121 | 147 |
| 4 | 33 | 77 | 123 | 151 |
| Mean | 28.5 | 74.8 | 119.5 | 149.8 |
| Inch/min | 2.10 | 2.00 | 2.00 | 2.00 |

Figure 2:
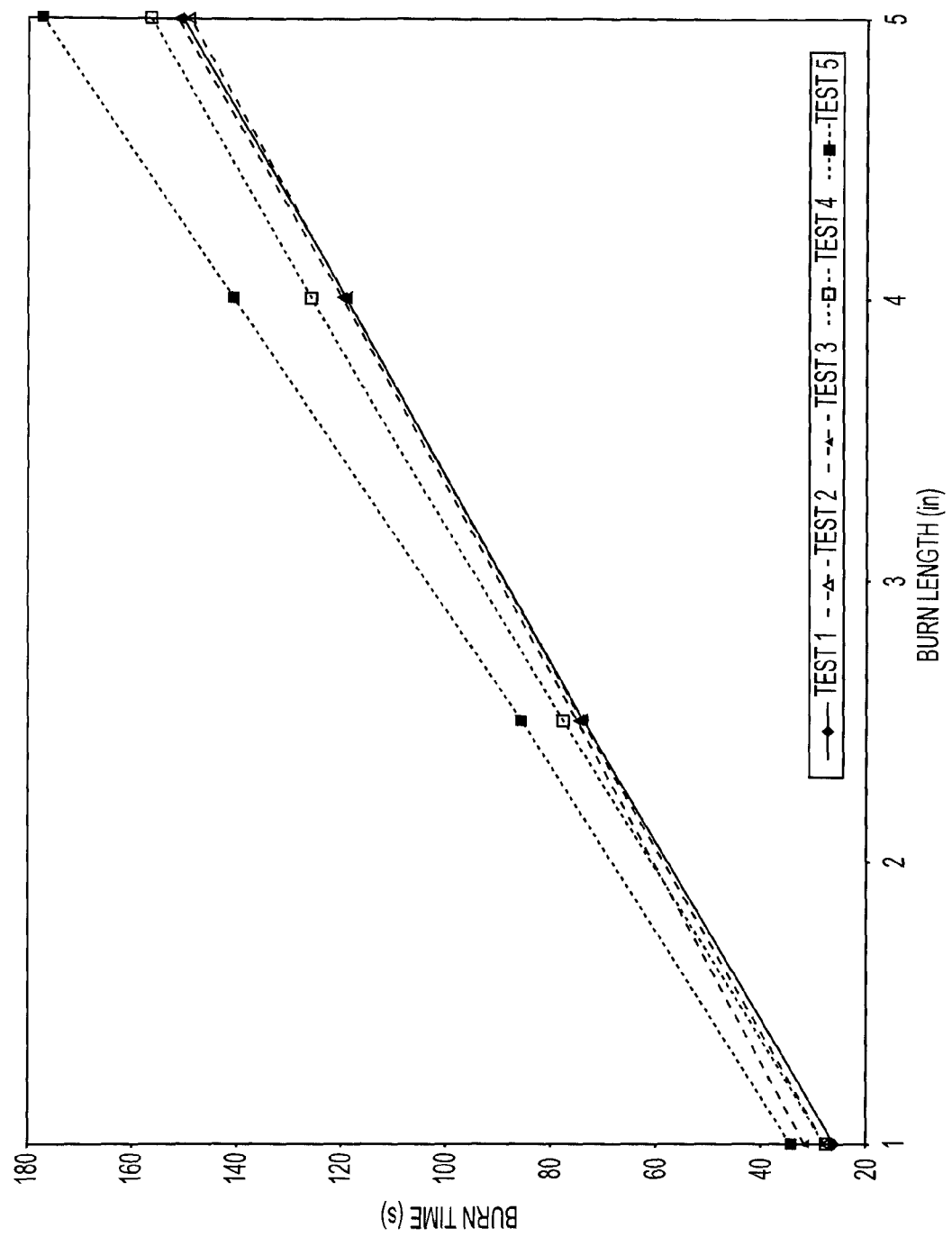
FIG. 2 is a graph of flammability test results for an epoxy/glass composite with and without the addition of nanoclays.

The samples are compliant since the burn rate is below 3 in/min. A comparison of the curves of FIG. 2 shows that the results obtained with 2% Cloisite® 30B (Test 2) are similar to those obtained with the epoxy/glass without nanoclay (Test 1): the sample takes longer to burn to the 1 inch mark in Test 2, but the time taken to reach the 5 inch length is similar.

Test 3

Epoxy/Glass With 4% Cloisite® 30B

Samples were cut from an epoxy/glass composite with a 4% weight addition of nanoclay. The resin and hardener were the same as that in Tests 1-2 and the nanoclay the same as that in Test 2, Cloisite® 30B. The thickness of the samples was approximately 1.5 mm. The results are set forth in the table below.

Seconds to reach burn length, epoxy/glass, 4% Cloisite® 30B

| No. | 1 in | 2.5 in | 4 in | 5 in |
|---|---|---|---|---|
| 1 | 36 | 78 | 121 | 154 |
| 2 | 27 | 69 | 118 | 151 |
| 3 | 38 | 79 | 129 | 158 |
| 4 | 27 | 75 | 116 | 149 |
| 5 | 34 | 78 | 118 | 150 |
| Mean | 32.4 | 75.8 | 120.4 | 152.4 |
| Inch/min | 1.85 | 1.98 | 1.99 | 1.97 |

The samples are compliant since the burn rate is below 3 in/min. A comparison of the curves of FIG. 2 shows that the 4% Cloisite® 30B (Test 3) provides for a lower level of flammability than the epoxy/glass without nanoclay (Test 1) and with 2% Cloisite® 30B (Test 2): the sample takes longer to burn to all the marks in Test 3, with the difference being more pronounced at the beginning (1 inch mark).

Test 4

Epoxy/Glass With 2% Nanomer® 1.30E

Samples were cut from an epoxy/glass composite with a 2% weight addition of another nanoclay. The resin and hardener were the same as that in Tests 1-3. The nanoclay was Nanomer® 1.30E, described above. The thickness of the samples was approximately 1.5 mm. The results are set forth in the table below.

Seconds to reach burn length, epoxy/glass, 2% Nanomer® 1.30E

| No. | 1 in | 2.5 in | 4 in | 5 in |
|---|---|---|---|---|
| 1 | 28 | 80 | 125 | 159 |
| 2 | 27 | 75 | 125 | 153 |
| 3 | 30 | 85 | 135 | 172 |
| 4 | 30 | 76 | 126 | 152 |
| 5 | 26 | 76 | 121 | 150 |
| Mean | 28.2 | 78.4 | 126.4 | 157.2 |
| Inch/min | 2.13 | 1.91 | 1.90 | 1.91 |

The samples are compliant since the burn rate is below 3 in/min. A comparison of the curves of FIG. 2 shows that the 2% Nanomer® 1.30E (Test 4) provides for a lower level of flammability than the epoxy/glass without nanoclay (Test 1): the sample takes longer to burn to all the marks in Test 3, with the difference being more pronounced at the end (5 inch length). Although the samples of Test 4 initially burn more quickly than those with 4% Cloisite® 30B (Test 3) up to the 1 inch mark, over the complete length of the samples the 2% Nanomer® 1.30E (Test 4) performs slightly better.

Test 5

Epoxy/Glass With 4% Nanomer® 1.30E

Samples were cut from an epoxy/glass composite with a 4% weight addition of nanoclay. The resin and hardener were the same as that in Tests 1-4 and the nanoclay the same as that in Test 4, Nanomer® 1.30E. The thickness of the samples was approximately 1.5 mm. The results are set forth in the table below.

Seconds to reach burn length, epoxy/glass, 4% Nanomer® 1.30E

| No. | 1 in | 2.5 in | 4 in | 5 in |
|---|---|---|---|---|
| 1 | 35 | 86 | 140 | 178 |
| 2 | 35 | 92 | 146 | 183 |
| 3 | 34 | 84 | 137 | 168 |
| 4 | 40 | 90 | 148 | 188 |
| 5 | 31 | 79 | 135 | 170 |
| Mean | 35.0 | 86.2 | 141.2 | 177.4 |
| Inch/min | 1.71 | 1.74 | 1.70 | 1.69 |

The samples are compliant since the burn rate is below 3 in/min. A comparison of the curves of FIG. 2 shows that the 4% Nanomer® I.30E (Test 5) provides for a significantly lower level of flammability than the epoxy/glass without nanoclay (Test 1), with 2% Nanomer® I.30E (Test 4), and with 2% and 4% Cloisite® 30B (Tests 2-3): the sample takes longer to burn to all the marks in Test 5, with the difference becoming more pronounced at the end (5 inch length).

Test 6

Polyamide-6

Samples were cut from a polyamide-6 material, without nanoclay. Two rounds of tests were performed. The five samples of the first round had a thickness of between 1.31 mm and 1.38 mm. The five samples of the second round had a thickness of between 1.27 mm and 1.35 mm. All samples burned up to the first mark (at 1 in) before the 30 seconds of application of the flame were over, and as are considered as non compliant.

Test 7

Polyamide-6 With 2% Cloisite® 15A

Samples were cut from a polyamide-6 material with a 2% weight addition of nanoclay. The polyamide was the same as that in Test 6. The nanoclay was Cloisite® 15A. Three rounds of tests were performed. The five samples of the first round had a thickness of between 1.17 mm and 1.26 mm.

The five samples of the second round had a thickness of between 1.18 mm and 1.22 mm. The five samples of the third round had a thickness of between 1.19 mm and 1.24 mm. All samples but one in the second round and one in the third round burned up to the first mark (at 1 in) before the 30 seconds of application of the flame were over, and as were considered as non compliant. In the first two rounds there was a lot less bubbles that in Test 6. The samples did not instantly melt but the portion exposed to the flame became transparent and fell in one piece. In the third round, the samples melted and fuelled combustion; a lot of bubbles were produced.

The results for the samples that did not burn up to the first mark (at 1 in) before the 30 seconds of application of the flame were over are shown in the table below. These samples are considered as non compliant because they burned completely and melted.

Seconds to reach burn length, polyamide-6, 2% Cloisite® 15A

| No. | 1 in | 2.5 in | 4 in | 5 in |
| --- | --- | --- | --- | --- |
| Round 2-1 | 54 | 136 | 189 | — |
| Round 3-3 | 58 | 142 | 190 | — |

Test 8

Polyamide-6 With 4% Cloisite® 15A

Samples were cut from a polyamide-6 material with a 4% weight addition of nanoclay. The polyamide was the same as that in Tests 6-7 and the nanoclay was the same as that in Test 7, Cloisite® 15A. The thickness of the samples was between 1.21 mm and 1.29 mm. All samples burned completely before reaching the 5 in mark and as such are considered non compliant. The results are set forth in the table below.

Seconds to reach burn length, polyamide-6, 4% Cloisite® 15A

| No. | 1 in | 2.5 in | 4 in | 5 in |
| --- | --- | --- | --- | --- |
| 1 | 38 | 87 | 131 | — |
| 2 | 31 | 91 | 126 | — |
| 3 | 70 | 132 | 145 | — |
| 4 | 62 | 116 | 138 | — |
| 5 | 56 | 103 | 142 | — |

Test 9

Polyamide-6 With 2% ME100

Samples were cut from a polyamide-6 material with a 2% weight addition of another nanoclay. The polyamide was the same as that in Tests 6-8 and the nanoclay was the synthetic nanoclay ME100 (from Somasif CBC chemical Co.). The thickness of the samples was between 1.26 mm and 1.36 mm. These samples are considered as non compliant because all samples burned under the applied flame. More bubbles were produced than in Test 6 (polyamide-6 without nanoclay). White smoke was been observed. The samples did not melt immediately but the portion exposed to the flame became transparent and dropped.

Test 10

Polyamide-6 With 4% ME100

Samples were cut from a polyamide-6 material with a 4% weight addition of nanoclay. The thickness of the samples was between 1.27 mm and 1.31 mm. The polyamide was the same as that in Tests 6-9 and the nanoclay was the same as that in Test 9, ME100. These samples are considered as non compliant because all samples melted and burned under the applied flame, similarly to Test 9.

Test 11

Polyethylene

Samples were cut from a polyethylene material, without nanoclay. The thickness of the samples was between 1.22 mm and 1.27 mm. With the horizontal test the combustion stopped immediately. A test was performed with the samples extending vertically, and the samples melted and ran like water. The samples are considered as non compliant because of the very high rate of flammability observed.

Test 12

Polyethylene With 2% Cloisite® 15A

Samples were cut from a polyethylene material with a 2% weight addition of nanoclay. The polyethylene was the same as that in Test 9. The nanoclay was Cloisite® 15A. The thickness of the samples was between 1.24 mm and 1.32 mm. The samples burned very quickly vertically, ran and continued to burn on the ground. A lot of smoke was produced. The samples are considered as non compliant because of the very high rate of flammability observed.

During the tests, it was found that the addition of the montmorillonite to the epoxy/glass composite increased the burning time and the char of the sample was less deformed after the test. In addition, the presence of montmorillonite in the epoxy/glass composite reduced falling fragments during combustion. As such the presence of montmorillonite in the epoxy/glass composite may help limit the spread of the flame during combustion, which may be a consideration for structural materials.

It has been found that nanoclays suitable for inclusion in the fuel pipe material may be described as organically modified, nanometer scale, layered magnesium aluminum silicate platelets. In the present application, "organically modified" refers to the modification of the substantially inorganic nanoclay (i.e. generally free of carbon and hydrogen groups) to make it organophilic. In a particular embodiment, the organically modified clay includes covalently linked organic moieties that have been modified with a $C_2$-$C_{12}$ alkylamine, preferably a quaternary amine with a $C_8$-$C_{10}$ alkyl, to make it organophilic. Recommended clays include Cloisite® 30B and Nanomer® I.30E and also other types of montmorillonite such as Cloisite® 20A, Cloisite® Na, Nanomer® 1.44P, Cloisite® 25A, and Cloisite® 15A.

With the epoxy/glass composite tested, both montmorillonites provided for better results with the 4% weight concentration than with the 2% weight concentration.

As such, it is concluded that a composite material including a matrix composed of an epoxy copolymer obtained through the reaction of a resin of the bisphenol A diglycidyl ether type with an amine hardener, and between 3 to 5% of an organically modified nanoclay by weight of the epoxy copolymer with the nanoclay including layered magnesium aluminum silicate platelets, and reinforcing fibers embedded in the matrix, provides for a material particularly suitable for the manufacture of composite fuel pipes in an aircraft, with respect to flammability requirements. The resin is preferably a bisphenol A epichlorohydrin based resin, and preferably a phenol, 4,4O- (1-methylethylidene) bis-polymer with (chloromethyl) oxirane. The nanoclay is preferably provided in a 4% weight proportion to the epoxy copolymer, and is preferably a montmorillonite. The amine hardener is preferably an amidoamine.

In a particular embodiment, the addition of the nanoclay also improves the stability of the composite fuel pipes. The added particles may participate in maintaining the form of the structure even in case of fire, and minimize dropping of the polymer phase. As such the possibility of spreading the fire to other parts may be reduced.

The above description is meant to be exemplary only, and one skilled in the art will recognize that changes may be made to the embodiments described without departing from the scope of the invention disclosed. Modifications which fall within the scope of the present invention will be apparent to those skilled in the art, in light of a review of this disclosure, and such modifications are intended to fall within the appended claims.

The invention claimed is:

1. A fuel pipe for an aircraft, the fuel pipe made of a single tubular wall made of a material including:
   a matrix composed of
      an epoxy copolymer obtained through the reaction of a resin of the bisphenol A diglycidyl ether type with an amine hardener, and
      from 3 to 5% of an organically modified nanoclay by weight of the epoxy copolymer, the nanoclay including layered magnesium aluminum silicate platelets, the nanoclay reducing flammability of the material; and
   reinforcing fibers embedded in the matrix,
   wherein the nanoclay is dispersed in the resin by using a mechanical mixer operating around 10000 RPM for 10 minutes, with a temperature control below 120° C.

2. The fuel pipe as defined in claim 1, wherein the resin is a bisphenol A epichlorohydrin based resin.

3. The fuel pipe as defined in claim 1, wherein the resin is a phenol, 4,40 - (1- methylethylidene) bis-polymer with (chloromethyl) oxirane.

4. The fuel pipe as defined in claim 1, wherein the resin includes or is composed of $C_{60}H_{64}O_8 \cdot C_{12}H_{20}Cl_4O_4$.

5. The fuel pipe as defined in claim 1, wherein the resin includes or is composed of $(C_{15}H_{16}O_2 \cdot C_3H_5ClO)_x$, where x is from 2 to 10.

6. The fuel pipe as defined in claim 1, wherein the resin includes, is composed of or is derived from

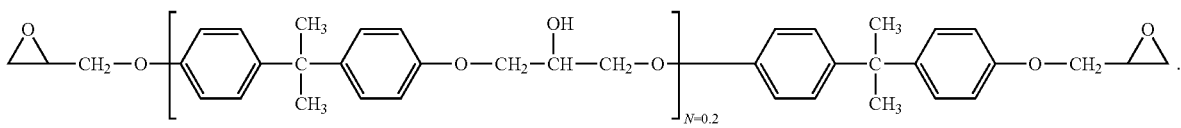

7. The fuel pipe as defined in claim 1, wherein the matrix includes 4% of the organically modified nanoclay by weight of the epoxy copolymer.

8. The fuel pipe as defined in claim 1, wherein the nanoclay is an organically modified montmorillonite.

9. The fuel pipe as defined in claim 1, wherein the nanoclay is a natural montmorillonite modified with a quaternary ammonium salt and treated with MT2EtOH (methyl, tallow, bis-(2-hydroxyethyl) quaternary ammonium).

10. The fuel pipe as defined in claim 9, wherein the tallow includes about 65% C18, about 30% C16 and about 5% C14.

11. The fuel pipe as defined in claim 1, wherein the nanoclay is a surface modified montmorillonite treated with ODA (octadecyl amine).

12. The fuel pipe as defined in claim 1, wherein the fibers are woven fibers.

13. The fuel pipe as defined in claim 1, wherein the fibers are selected from the group consisting of glass fibers, aramid fibers, flax fibers, carbon fibers and combinations thereof.

14. The fuel pipes as defined in claim 13, wherein the fibers are glass fibers selected from the group consisting of E-glass (alumino-borosilicate glass with less than 1% w/w alkali oxides), A-glass (alkali-lime glass without a significant proportion of boron oxide), E-CR-glass (alumino-lime silicate with less than 1% w/w alkali oxides), C-glass (alkali-lime glass with boron oxide), D-glass (borosilicate glass), R-glass (alumino silicate glass without MgO and CaO), S-glass (alumino silicate glass with high MgO and without CaO), and combinations thereof.

15. The fuel pipe as defined in claim 1, wherein the hardener is an amidoamine.

16. The fuel pipe as defined in claim 15, wherein the hardener includes triethylenetetramine.

17. The fuel pipe as defined in claim 1, wherein a weight proportion of the resin to the hardener is from 35% to 100%.

18. The fuel pipe as defined in claim 17, wherein the weight proportion of the resin to the hardener is about 2:1.

* * * * *